May 21, 1946. A. D. STRAHM 2,400,613
COFFEE MAKER
Filed Dec. 14, 1943
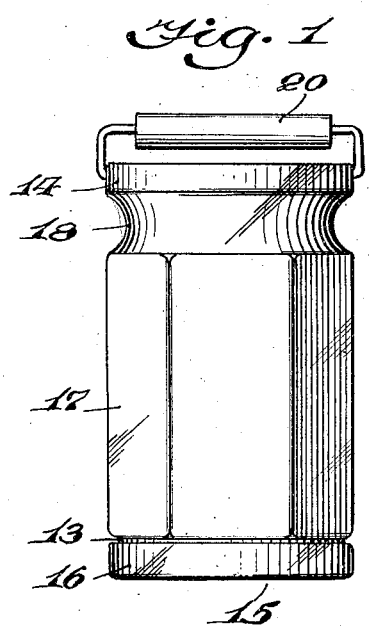
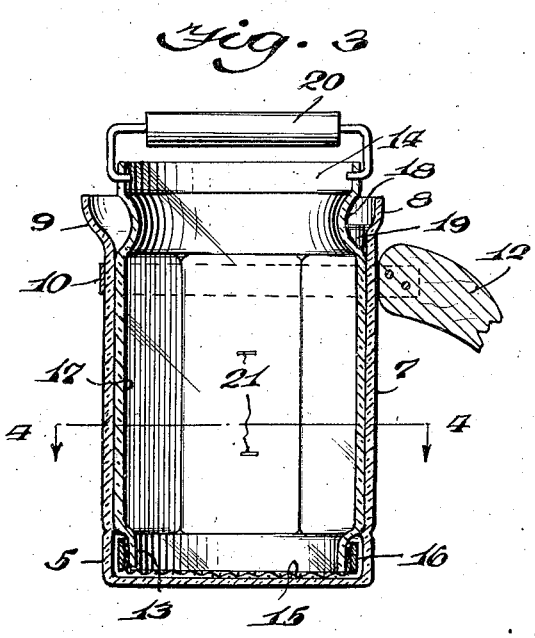
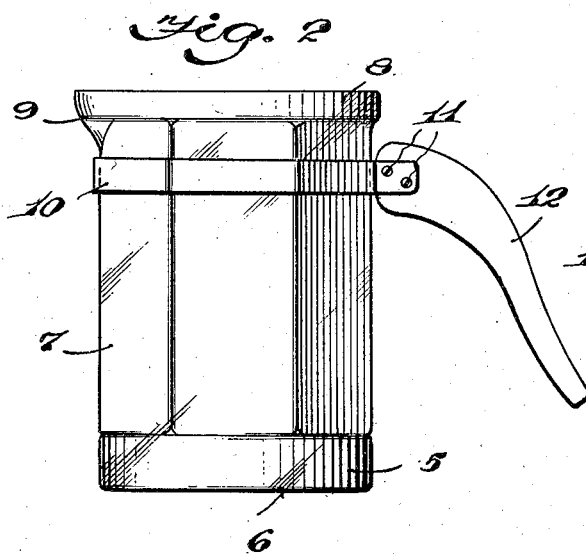
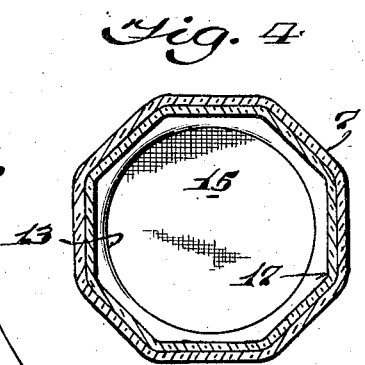
Inventor
Allen D. Strahm,
By Barry & Cyr.
Attorneys Patented May 21, 1946

2,400,613

UNITED STATES PATENT OFFICE 2,400,613

COFFEE MAKER

Allen D. Strahm, Tulsa, Okla.

Application December 14, 1943, Serial No. 514,249

2 Claims. (Cl. 99—318)

This invention relates to coffee-making devices, and more particularly to the brewing of coffee by bringing it in contact with hot water for the purpose of extracting the aromatic oils of the coffee in such a way as to produce a pleasing flavor. Until a few years ago, all coffee brewed at home was made by simply boiling water and ground coffee together. This produced a strong black coffee with a flavor which is still preferred by some people. In such procedure, coarsely ground coffee is used, and after the grounds were thoroughly boiled, they were precipitated by one means or another. However, some of the grounds usually found their way into the drinker's cup so that the coffee at the bottom portion of the cup had to be strained. For this and other reasons, the newer methods of brewing coffee are now more generally preferred.

In the percolator method a metal pot with an interior assembly comprising a perforated container for the ground coffee, is mounted near the top of a center tube that extends from the top to the bottom of the pot. The lower end of the tube is attached to a hollow pedestal resting on the bottom of the pot. When heat is applied to the bottom of the pot and boiling begins, vapor pressure within the pedestal forces water upward through the tube and onto the ground coffee in the perforated container. It passes downward through the ground coffee and drips back again into the bottom of the pot. As long as boiling is continuous, this circulation is repeated and the brew gathers in strength as it passes continuously through the ground coffee.

A somewhat better flavor is obtained by the percolator method as compared with the use of the old-fashioned coffee pot, because the ground coffee is never subjected to the intense boiling as with the old-fashioned method. However, the brewed coffee, itself, is boiled by the percolator method, and whenever boiling occurs, the delicate ends of the flavor are driven off into the air, while the heavy and more bitter ends are retained and intensified as the boiling continues.

For this reason the percolator method has been abandoned by many in favor of the so-called dripolator or vacuum coffee brewing method. While the percolator keeps the coffee grounds fairly well separated from the finished brew, such device is not practical for making less than about four cups of coffee at one time. Furthermore the percolator has quite a few separable parts, and it is rather difficult to clean thoroughly.

The so-called dripolator is a simple device, and makes a brew that is considered better by most people. The dripolators are usually made of metal or glass. The metal style consists of three principal parts, the upper hot water container, the ground coffee container, and the lower brewed coffee container. The glass type differs from the metal one in that the ground coffee container is omitted; the upper hot water container being provided with a filter cloth at its lower end to support the ground coffee. With either type of dripolator, the desired amount of ground coffee is placed in the coffee compartment and boiling water is poured into the upper container from which it will pass downwardly through the ground coffee into the lower container, while leaving the grounds behind. While the dripolator has advantages, it, also, has disadvantages:

1. Water must be measured and heated in a separate utensil before brewing coffee, resulting in extra work.

2. Since the dripolator itself is cold and receives no heat except from the hot water poured into it, considerable heat is lost in the process, and usually the dripped coffee has to be reheated in order to serve it sufficiently hot. This takes extra time, and there is always danger that the brew will be allowed to boil, in which case its flavor will be damaged.

3. In the metal type, the grounds cannot be stirred with the water and consequently, all of the good flavor of the coffee is not derived from it. This means that more ground coffee is required to make brew of the desired strength than by other methods.

4. There is no means provided in either the metal or glass dripolator for holding the ground coffee and hot water in contact longer than the time which it takes for the water to escape to the lower container. Inasmuch as the water begins to escape from the ground coffee immediately, the first that passes through is weak in flavor with the strength increasing as the flow continues. On the other hand, if all the water passes through too quickly, more ground coffee must be used to offset the fact that there has not been enough time for all available strength to become imparted to the water.

In the vacuum method, the device used consists of upper and lower containers, the upper one having a tube extending downwardly into the bottom portion of the lower container, with a filter of one kind or another arranged at the upper end of the tube.

In using the vacuum device, a measured amount of ground coffee is deposited in the upper portion. When the water in the lower container nears the boiling point, vapor pressure on the water in the lower container forces it up through the tube into the upper container until the water in the lower container drops substantially to the level of the bottom of the tube. The hot water and ground coffee now in the upper container is stirred and the device is removed from the heat. As soon as the lower container cools, the vapor therein condenses and creates a vacuum which draws the brew through the strainer back down through the tube to the lower container.

The coffee brewed by this method is excellent in flavor, but the method also has disadvantages:

1. The glass vacuum coffee maker is a very fragile device and awkward to handle. It is easily broken while being used or cleaned. It must be carefully handled at all times to prevent breakage.

2. It is top-heavy when the hot water is all in the upper container, and it will, occasionally topple over while being stirred or removed from the fire. If the fire under the coffee is carelessly turned too high, the water may be expelled rather violently which creates quite a mess if water and coffee grounds are thrown out of the top. Sometimes the device will even tip over, and they have been known to explode under this condition causing injury to anyone unfortunate enough to be standing near.

3. A considerable part of the water in the lower container never reaches the upper container. The device must be constructed so that enough water is retained in the bottom to prevent breakage which may occur if fire is applied to the dry glass. For this reason the vacuum method is not adaptable for making as little as just one cup of coffee.

4. Occasionally the seal between the upper and lower containers is not tight and when this condition exists, the brew will not return to the lower container.

5. Due to the small size of its filter, the fineness of the ground coffee and its depth above the filter, the filter sometimes becomes clogged, and the brew is far too slow in returning to the lower bowl. Sometimes this condition will cause the vacuum to become lost so that the brew will cease flowing entirely toward the lower bowl.

6. Rubber collars and filter cloths must be renewed and are often difficult to find in certain sizes and models.

The primary purpose of the present invention is to provide a novel coffee making device designed to retain the advantages inherent in the coffee makers heretofore known and to eliminate their disadvantages. This I accomplish in a very simple and practical way, as the device consists of only two essential parts which can be made of either glass or metal.

The improved coffee maker is illustrated in the accompanying drawing, in which Fig. 1 is an elevation of the internal part or strainer unit.

Fig. 2 is a similar view of the container or external element.

Fig. 3 is a vertical sectional view of the two parts assembled.

Fig. 4 is a horizontal sectional view taken on the line 4—4 of Fig. 3.

Referring to the drawing, 5 designates the cylindrical lower end portion of the container which has a closed bottom 6. A polygonal wall 7 of octagonal shape in horizontal cross section rises from the cylinder 5, and merges with a cylindrical mouth 8 at the top of the container, provided at one side with a pouring spout or lip 9.

For handling purposes, a band 10 of metal or the like may be extended around the container and may be rigidly secured, as indicated at 11, to a handle 12.

The strainer unit is of tubular form terminating at its lower end in a cylindrical ring 13, and at its upper end in a similar ring 14. The ring 13 is adapted to be secured to a piece 15 of filter cloth or paper, removably secured in position by a retaining ring 16 detachably connected to the lower end of the strainer unit. As may be seen from Fig. 3, the external diameter of the ring 16 is only slightly less than the internal diameter of the cylindrical portion 5 of the container.

The strainer unit is also provided with an octagonal wall 17, the external diameter of which is only slightly less than the internal diameter of the octagonal wall of the container, and the wall 17 is joined to the cylindrical mouth 14 by means of a channel-shaped wall 18 which extends inwardly toward the axis of the device. From Fig. 3, it will be noted that the parts 7 and 18 form an annular groove 19 at the upper end of wall 17 to provide a trap for liquid which might boil up at some point between the walls and from which trap such liquid can fall back again between the walls by gravity instead of boiling out over the top of the container.

To facilitate handling, the strainer unit is preferably provided with a bail 20, and to aid in measuring, the inner container may be provided with graduation marks 21, if the device is made of opaque material. Of course, if the device is made of glass, the marks to indicate cups may be placed on either the strainer unit or the container.

In using the device, sufficient water is placed in the container for the amount of brew desired. Then the container is put on the fire to heat. When the water comes to a boil, the fire is turned out, and the strainer unit is introduced into the container. This may be easily and quickly done as the water passes freely upward through the cloth strainer, as the strainer unit sinks to the bottom of the container. Afterwards drip grind coffee is added to the water. Then the grounds and water are stirred shortly before the mixture is allowed to steep for approximately three minutes. Then the strainer unit is lifted upwardly by means of the bail until the unit can be turned to either right or left. A slight turn in either direction will cause the octagonal wall of the strainer unit to move out of register with the octagonal wall of the container. Consequently, the lower end of the octagonal wall of the strainer unit will be brought to rest on the upper end of the octagonal wall of the container so that the brewed coffee can be quickly strained into the container. After straining, the strainer unit is removed, and the brew is ready to serve from the container.

*Advantages of the improved coffee maker*

1. Brewing is accomplished by the principle of steeping. This permits the greatest economy with respect to the amount of coffee used, as the brew absorbs all available flavor before any of the brew is permitted to escape through the strainer.

2. No outside utensil is required for heating the water.

3. Since the whole device becomes thoroughly hot, while the water is being heated, it stays so during the entire process of making the brew and, therefore, eliminates reheating.

4. Very small amounts of coffee can be made, a cup or even less, because the amount of water between the walls of the container and strainer unit is so small that it will not appreciably dilute the brew that reaches it.

5. The device is compact in design, easy to handle, and requires little space for storage.

6. Its use is easy to learn and understand. It can also be used to steep tea equally as well as coffee.

7. It is easy to clean and the only part needing replacement in ordinary use would be the filter cloth. A person could easily make his own if necessary as no hemming or draw strings are required.

8. There is nothing of a mechanical nature to get out of order and cause failure as with the vacuum type maker.

9. It can be used for brewing coffee in the old-fashioned way if desired, and after the brew is boiled for as long as required, the strainer unit can be removed so as to eliminate the grounds from the brew.

From the foregoing, it is believed that the construction of my improved coffee maker and the advantages thereof may be readily understood, and it is apparent that changes may be made in the details disclosed without departing from the spirit of the invention as expressed in the following claims.

What I claim and desired to secure by Letters Patent is:

1. A coffee maker comprising an outer container unit and an inner filter unit snugly fitting therein, each of said units having walls provided with polygonal portions extending through the greater portion of the height thereof, the upper end portion of the outer container unit being of substantially circular shape and of slightly greater diameter than the polygonal portion of the wall of the outer container unit to provide an internal shoulder the external diameter of the polygonal portion of the wall of the filter unit being substantially equal to the internal diameter of the polygonal portion of the wall of the container unit, whereby when the filter unit is elevated to a sufficient height relatively to the container unit and turned to place said polygonal portions out of register, the shoulder at the upper end of the polygonal portion of the container unit will support the filter unit.

2. A coffee maker comprising an outer container unit and an inner filter unit, each of said units having walls provided with polygonal portions extending through a portion of the height thereof, the external diameter of the polygonal portion of the wall of the filter unit being substantially equal to the internal diameter of the polygonal portion of the wall of the container unit, whereby when the filter unit is elevated relatively to the container unit and turned to place said polygonal portions out of register, the polygonal portion of the container unit will support the filter unit, the upper end portion of the filter unit being contracted and forming an annular groove facing the interior of the upper end portion of the container unit to provide a liquid trap.

ALLEN D. STRAHM.